US007710424B1

(12) United States Patent
Hutchins et al.

(10) Patent No.: US 7,710,424 B1
(45) Date of Patent: May 4, 2010

(54) METHOD AND SYSTEM FOR A TEXTURE-AWARE VIRTUAL MEMORY SUBSYSTEM

(75) Inventors: Edward A. Hutchins, Mountain View, CA (US); James T. Battle, Austin, TX (US); Bruce K. Holmer, Belmont, CA (US)

(73) Assignee: Nvidia Corporation, Santa Clara, CA (US)

( * ) Notice: Subject to any disclaimer, the term of this patent is extended or adjusted under 35 U.S.C. 154(b) by 399 days.

(21) Appl. No.: 10/993,679

(22) Filed: Nov. 18, 2004

(51) Int. Cl.
*G06F 13/00* (2006.01)
*G06T 11/40* (2006.01)
*G09G 5/36* (2006.01)
*G09G 5/00* (2006.01)

(52) U.S. Cl. ...................... 345/537; 345/552; 345/557; 345/582

(58) Field of Classification Search ................ 345/582, 345/557, 660; 711/115
See application file for complete search history.

(56) References Cited

U.S. PATENT DOCUMENTS 6,295,594 B1 9/2001 Meier
6,304,268 B1 * 10/2001 Iourcha et al. .............. 345/428
7,023,445 B1 * 4/2006 Sell ............................ 345/557
2001/0011326 A1 8/2001 Yoshikawa et al.
2002/0004860 A1 1/2002 Roman
2003/0016229 A1 * 1/2003 Dorbie et al. ............... 345/582
2005/0024376 A1 * 2/2005 Gettman et al. ............. 345/582
2005/0193169 A1 * 9/2005 Ahluwalia .................. 711/115

OTHER PUBLICATIONS

Final Office Action; Mail Date Aug. 11, 2008; U.S. Appl. No. 10/993,640.
Final Office Action; Mail Date Oct. 5, 2007; U.S. Appl. No. 10/993,640.
Non Final Office Action; Mail Date Jan. 28, 2008; U.S. Appl. No. 10/993,640.
Non Final Office Action; Mail Date Mar. 7, 2007; U.S. Appl. No. 10/993,640.
Non Final Office Action; Mail Date Jun. 8, 2009; U.S. Appl. No. 10/993,640.
Notice of Allowance; Mail Date Jan. 16, 2009; U.S. Appl. No. 10/993,640.

* cited by examiner

*Primary Examiner*—Kee M Tung
*Assistant Examiner*—Jacinta Crawford

(57) ABSTRACT

A method and system for accessing texture data is disclosed. The method includes the step of storing a low resolution version of a block of texture data in a low latency memory and storing a high resolution version of the block of texture data in high latency memory. Upon a request for the high resolution version of the block of texture data, the high resolution version is fetched from the high latency memory to the low latency memory. The low resolution version is subsequently accessed from the low latency memory until the high resolution version is fetched into the low latency memory.

25 Claims, 8 Drawing Sheets

METHOD AND SYSTEM FOR A TEXTURE-AWARE VIRTUAL MEMORY SUBSYSTEM

FIELD OF THE INVENTION

The present invention is generally related to computer implemented graphics. More particularly, the present invention is directed towards an efficient method for accessing memory.

BACKGROUND OF THE INVENTION

Recent advances in computer performance have enabled graphic systems to provide more realistic graphical images using personal computers and home video game computers. In such graphic systems, some procedure must be implemented to "render" or draw graphic primitives to the screen of the system. A "graphic primitive" is a basic component of a graphic picture, such as a polygon, e.g., a triangle, or a vector. All graphic pictures are formed with combinations of these graphic primitives. Many procedures may be utilized to perform graphic primitive rendering.

Texture mapping schemes were developed to enhance the images rendered by early graphics systems. Early graphic systems displayed images representing objects having extremely smooth surfaces. That is, textures, bumps, scratches, or other surface features were not modeled. In order to improve the quality of the image, texture mapping was developed to model the complexity of real world surface images. In general, texture mapping is the mapping of an image or a function onto a surface in three dimensions. For example, the texture would be a picture of whatever material the designer was trying to convey (e.g., brick, stone, vegetation, wood, etc.) and would contain shading information as well as the texture and color to create the impression of a complex, dimensional surface. Texture mapping is now widely established and widely implemented in most computer graphics systems.

Modern realistic texture mapping (e.g., as required for modern 3D rendering applications) requires the manipulation of large amounts of data. Generally speaking, as a given 3-D scene becomes more realistic, the more realistic the texture map (or simply texture) being used in the texture mapping operations. Accordingly, realistic high-resolution textures can be very large (e.g., several megabytes of data). The bandwidth required for accessing such textures is also very large. The memory and bandwidth requirements can exceed the capabilities of even the most modern real-time 3-D rendering systems.

One prior art approach to alleviating texture memory and bandwidth requirements involves the implementation of various schemes whereby only a sub portion of the texture that may be needed in a scene is fetched from memory at a time. Large textures are typically stored in system memory, as opposed to local graphics memory. To satisfy the bandwidth requirements and latency constraints, a sub portion of the texture is fetched into the local graphics memory and used in the texture mapping operations of the 3-D rendering process.

For example, one prior art scheme only fetches that portion of a texture that is needed to render the visible scene (e.g., that portion of the scene within the view volume). As the scene changes (e.g., as the viewpoint of the view volume changes), other portions of the texture are fetched as required. This technique relies on a page fault type mechanism to fetch needed texture data when that data is not resident in local graphics memory.

The problems with this approach is the amount of time required to fetch the needed texture data from system memory to the local graphics memory. The required texture data needs to be pulled in (e.g., DMA transfer) from the system memory via the system memory controller and graphics bus (e.g., AGP bus, PCI express, etc.). The data transfer bandwidth from system memory via the graphics bus is much lower than that from the local graphics memory. Additionally, there is a significant amount of added latency imposed on data transfers across the graphics bus.

The above problems increase the time required to service the texture data page fault. This delay can cause stalling of the graphics rendering pipeline. Such stalling is very harmful to real-time 3D rendering applications. The stalling often leads to choppy frame rates and other noticeable pauses when new texture data must be fetched.

Some 3D rendering applications are especially dependent on smooth and reliable access to needed texture data. For example, MIP mapping generally requires several versions of a given texture to be stored and available in local graphics memory (e.g., a full resolution version and several lower resolution versions of a texture), and hence, texture memory demands tend to be high. In a highly dynamic rendering environment where the rendered scene changes rapidly, high bandwidth low latency access to the texture data is critical to overall performance. Stalling the 3D rendering pipeline due to prior art page fault type texture fetching rapidly leads to choppy frame rates, noticeable pauses, and similar problems as the rendered scene changes.

One approach to maintaining rendering speed and frame rate is to increase the amount of local graphics memory (e.g., 128 Mb, 256 Mb, etc.). Such an approach is expensive. Another prior art solution is to increase the performance of the page fault handling system. This approach is also expensive, in that it can require expensive high speed components (e.g., multi channel system memory, exotic high speed DDR RAM, PCIx graphics bus, etc.). Even with such components, however, there are practical limits to the degree to which the performance of the prior art page fault texture memory fetching schemes can be improved. Thus, what is needed is a more efficient way to maintain rendering speed and frame rate for those 3D rendering applications that utilize texture mapping.

SUMMARY OF THE INVENTION

Embodiments of the present invention provide a method and system for implementing texture data access for real time 3D rendering applications. Embodiments of the present invention perform texture data access operations while maintaining rendering speed and frame rate for those 3D rendering applications that utilize texture mapping.

In one embodiment, the present invention is implemented as a method for storing texture data. The method includes the step of accessing a low resolution version of a block of texture data in a low latency memory and storing a high resolution version of the block of texture data in high latency memory. Upon a request for the high resolution version of the block of texture data, the high resolution version is fetched from the high latency memory to the low latency memory. The low resolution version is subsequently accessed from the low latency memory until the high resolution version is fetched into the low latency memory.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
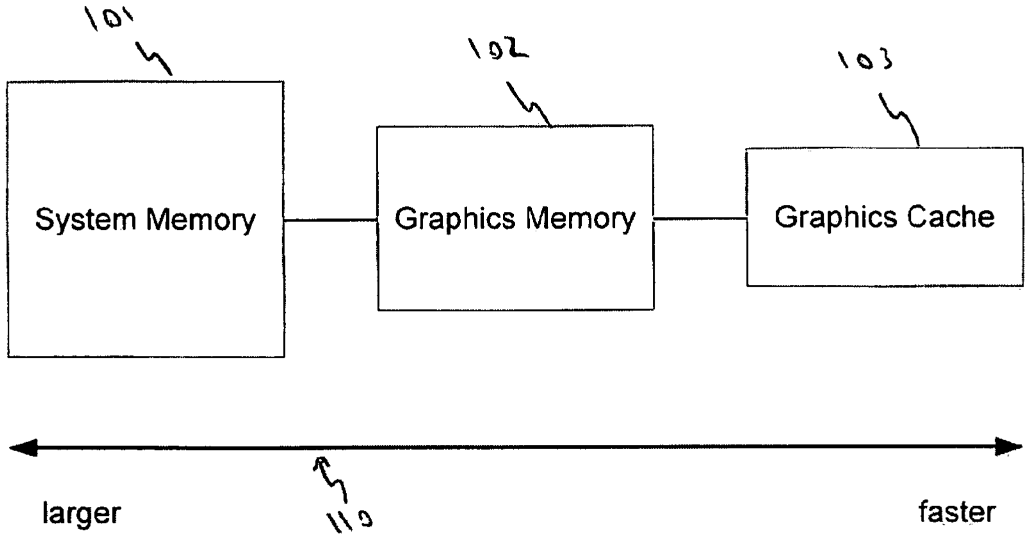
FIG. 1 shows a diagram depicting a memory interrelationship of an exemplary computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provide a method and system for implementing texture data access for real time 3D rendering applications. Embodiments of the present invention perform texture data access operations while maintaining rendering speed and frame rate for those 3D rendering applications that utilize texture mapping. Embodiments of the present invention and their benefits are further described below.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 500 of FIG. 6), or similar electronic computing device, that manipulates and transforms data represented as physical (electronic) quantities within the computer system's registers and memories into other data similarly represented as physical quantities within the computer system memories or registers or other such information storage, transmission or display devices.

EMBODIMENTS OF THE INVENTION

FIG. 1 shows a diagram depicting a memory interrelationship of an exemplary computer system in accordance with one embodiment of the present invention. As depicted in FIG. 1, three separate blocks of memory, system memory 101, graphics memory 102, and graphics cache 103 are shown. The axis 110 is depicted to indicate the relative size and relative latency of the memory blocks 101-103.

As shown in FIG. 1, the system memory (e.g., system memory 101) of a computer system is generally larger than the graphics memory (e.g., graphics memory 102), as indicated by its relative location with respect to the axis 110. Similarly, the local graphics memory 103 is generally larger than the graphics cache (e.g., graphics cache 103) of, for example, a graphics processor unit (GPU). The axis 110 also indicates the relative speed of the memory blocks 101-103. For example, the graphics cache 103 generally has a lower latency and greater data transfer bandwidth than the graphics memory 102. Similarly, the graphics memory 102 has a lower latency and greater data transfer bandwidth than the system memory 101. Embodiments of the present invention recognize and exploit these size and performance differences between the memory blocks 101-103.

Referring still to FIG. 1, in one embodiment, the present invention is implemented as a method for accessing texture data stored between the memory blocks 101-103. As known by those skilled in the art, modern 3-D rendering applications can utilize large amounts of texture data in implementing their texture mapping processes. This texture data is typically divided, or otherwise apportioned, into chunks or blocks, and a stored in the memory blocks 101-103.

The data is accessed by a GPU as needed to render a given scene. For example, for high pixel count (e.g., 1600 by 1200 pixels, etc.) complex scenes, the several large texture maps are typically too large to fit within the graphics cache 103 or the graphics memory 102, and must be stored within the system memory 101. However, as described above, accessing the system memory is too slow to enable effective high-speed, real-time 3-D rendering by the GPU. Consequently, the large texture maps are divided into discrete blocks of texture data and these blocks are fetched, or otherwise transferred, into the higher speed graphics memory 102 and graphics cache 103. Texture mapping applications such as MIP mapping place usually high demands on the texture mapping system since several versions of a given texture map must be stored and accessed.

Since the graphics memory 102 and the graphics cache 103 are generally smaller than the system memory 101, the blocks of texture data (e.g., from one or more different MIP map levels) are fetched into the higher speed memory on an as-needed basis. Thus, for example, a MIP mapping texture operation can be implemented by the GPU accessing texture data from its high-speed graphics cache 103 (e.g., typically included within a GPU) and graphics memory 102 (e.g., typically coupled to the GPU via a high performance bus). In the prior art, when "nonresident" blocks of texture data are needed (e.g., required texture data that is not stored in the graphics memory 102 or the graphics cache 103), the GPU would fetch the required texture data from system memory 101, thereby stalling the GPU's graphics rendering pipeline until the required texture data is fetched.

Embodiments of the present invention utilize an intelligent texture data fetching process that maintains rendering speed and frame rate for the GPU. In one embodiment, several blocks of texture data (e.g., of differing resolutions) are stored in low latency memory. In those cases where a nonresident block is needed by the GPU, embodiments of the present invention utilize different resolution versions of a nonresident block, which are in fact resident in low latency memory, to maintain the rendering speed and frame rate speed while the correct resolution versions of the nonresident block of texture data is fetched into the low latency memory. This avoids stalling the graphics rendering pipeline while waiting for the correct resolution version of the texture data.

For example, when a nonresident block of texture data is needed by the GPU, the GPU can use a corresponding lower resolution block of the texture data in its texture mapping operation. As the corresponding lower resolution version of texture data is used, the GPU fetches the correct resolution version (e.g., the higher resolution version) from the high latency memory for storage in the low latency memory. Once the correct resolution version is stored in low latency memory, the texture mapping operation proceeds using the correct resolution version of the block of texture data. This maintains the GPU's rendering frame rate while avoiding a pipeline stall, as would be caused by waiting for the correct version of the texture data to be fetched.

Figure 2:
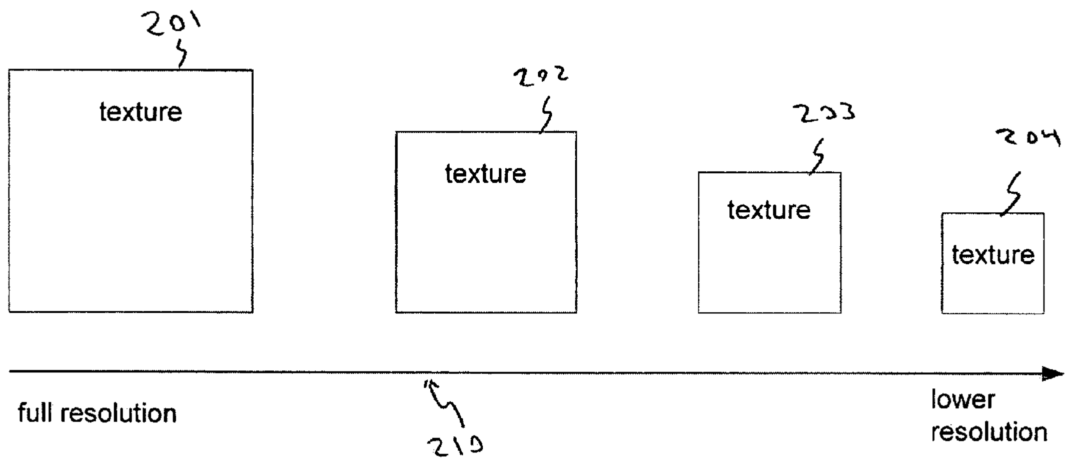
FIG. 2 shows a diagram depicting the relationship between different MIP map levels of a MIP mapping operation in accordance with one embodiment of the present invention.

FIG. 2 shows a diagram depicting the relationship between different MIP map levels of a MIP mapping operation in accordance with one embodiment of the present invention. As depicted in FIG. 2, four different resolution versions of a texture map (e.g., versions 201-204) are shown.

As known by those skilled in the art, MIP mapping is a widely used type of level of detail filtering used in a texture mapping process. The filtering is configured to prevent moiré interference patterns, aliasing, and rendering artifacts by using multiple lower resolution versions 202-204 of a texture map in addition to a full resolution version of the texture map 201. The full resolution version 201 contains all the surface details of the objects. For example, at close distances to a rendered object, the texture map 201 renders in its original full detail. As the distances increase, successively lower resolution versions of the texture (e.g., versions 202-204) are used, as indicated by the axis 210. By choosing the appropriate texture map resolution and detail, MIP mapping ensures that pixels do not get lost at further distances. Instead, properly averaged smaller versions of the original texture map are used. Each of these stages is known as a MIP map level. It should be noted that although FIG. 2 shows four versions 201-204, embodiments of the present invention can be implemented using other numbers of versions (e.g., 3, 7, 10, etc.).

Figure 3:
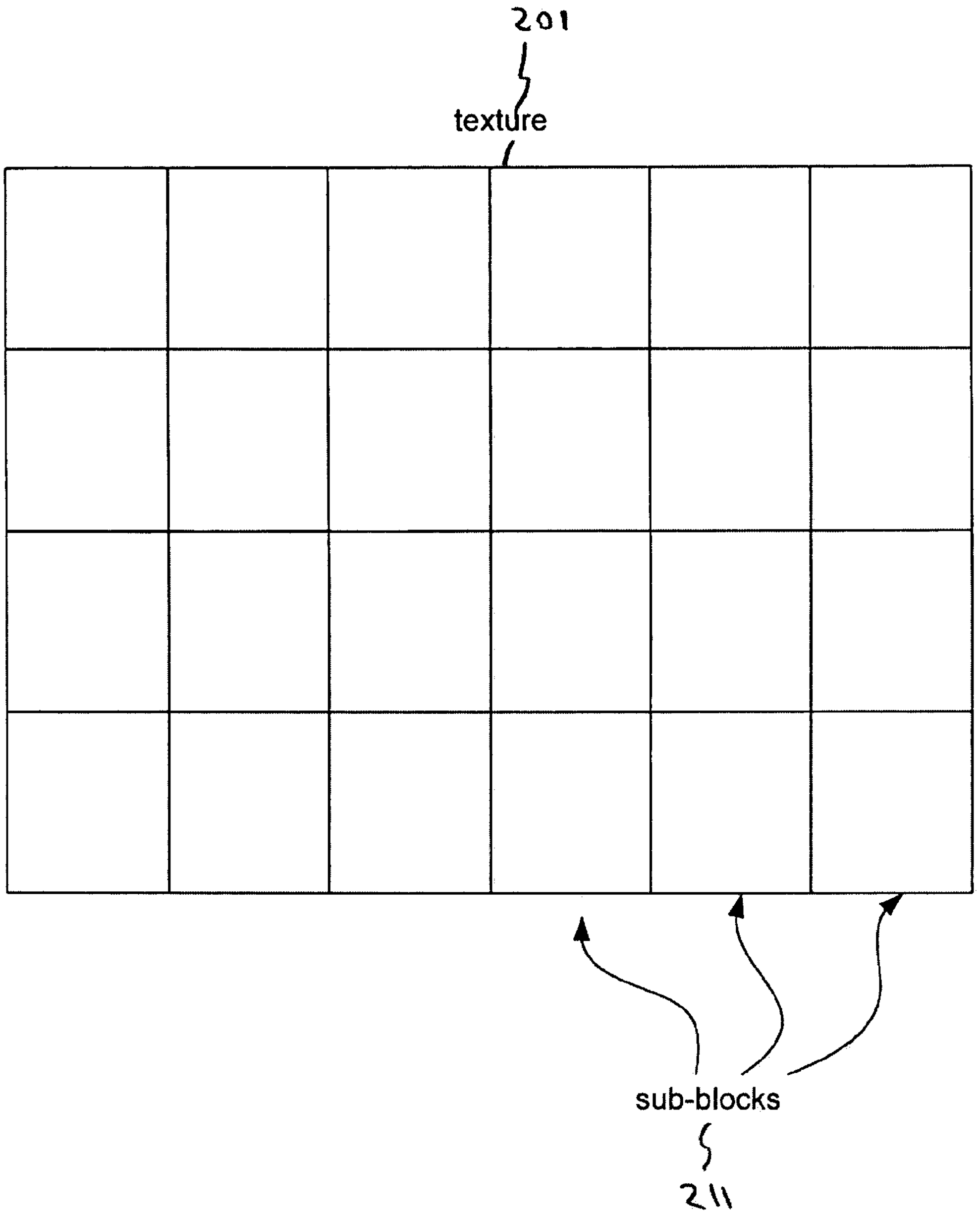
FIG. 3 shows a diagram of a MIP map version having been divided into a plurality of constituent blocks of texture data in accordance with one embodiment of the present invention.

FIG. 3 shows a diagram of the MIP map version 201 having been divided into a plurality of constituent blocks of texture data in accordance with one embodiment of the present invention. Three of such blocks 211 are indicated. As described above, different versions of the full resolution texture 201 comprise MIP map levels. Each of these levels are subdivided into a plurality of blocks of texture data (e.g., sub-blocks 211). The blocks 211 typically range in size from, for example, 256B to 4 KB or so, and the number of the blocks within a texture generally depends upon the size of the MIP map level. Accordingly, the blocks 211 comprise the blocks of texture data that embodiments of the present invention efficiently swap into and out of the low latency memory in accordance with the particular rendering demands of the given scene. Alternatively, in one embodiment, the size of the blocks 211 are constant, and thus one block from level 201 can cover the same area as, for example, a 2×2 group of blocks from level 202.

Figure 4:
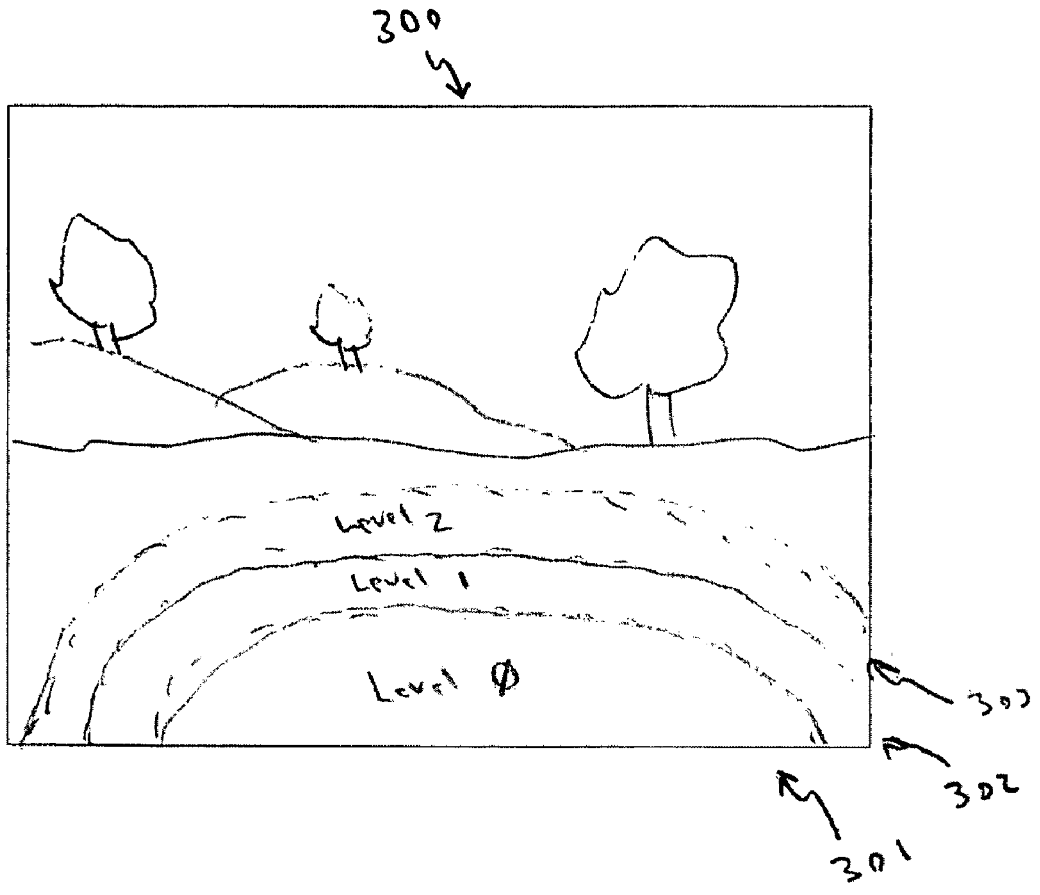
FIG. 4 shows a diagram depicting an exemplary MIP mapped 3D scene as produced by a GPU in accordance with one embodiment of the present invention.

FIG. 4 shows a diagram depicting an exemplary MIP mapped 3D scene 300 as produced by a GPU in accordance with one embodiment of the present invention. As depicted in FIG. 4, different MIP map levels 301-303 are illustrated within the 3D scene 300.

As described above, the different MIP map levels (e.g., levels 0, level 1, and level 2 as depicted in FIG. 4) are used to prevent moiré interference patterns, aliasing, and rendering artifacts. For example, at close distances, the level 301 renders in its original full detail. As the distances increase, successively smaller resolution versions of the texture (e.g., level 302-304) are used. Thus, as illustrated in scene 300, as the ground moves away into the distance, the different resolution bitmaps are used to texture the constituent polygon(s) of the ground.

Figure 5:
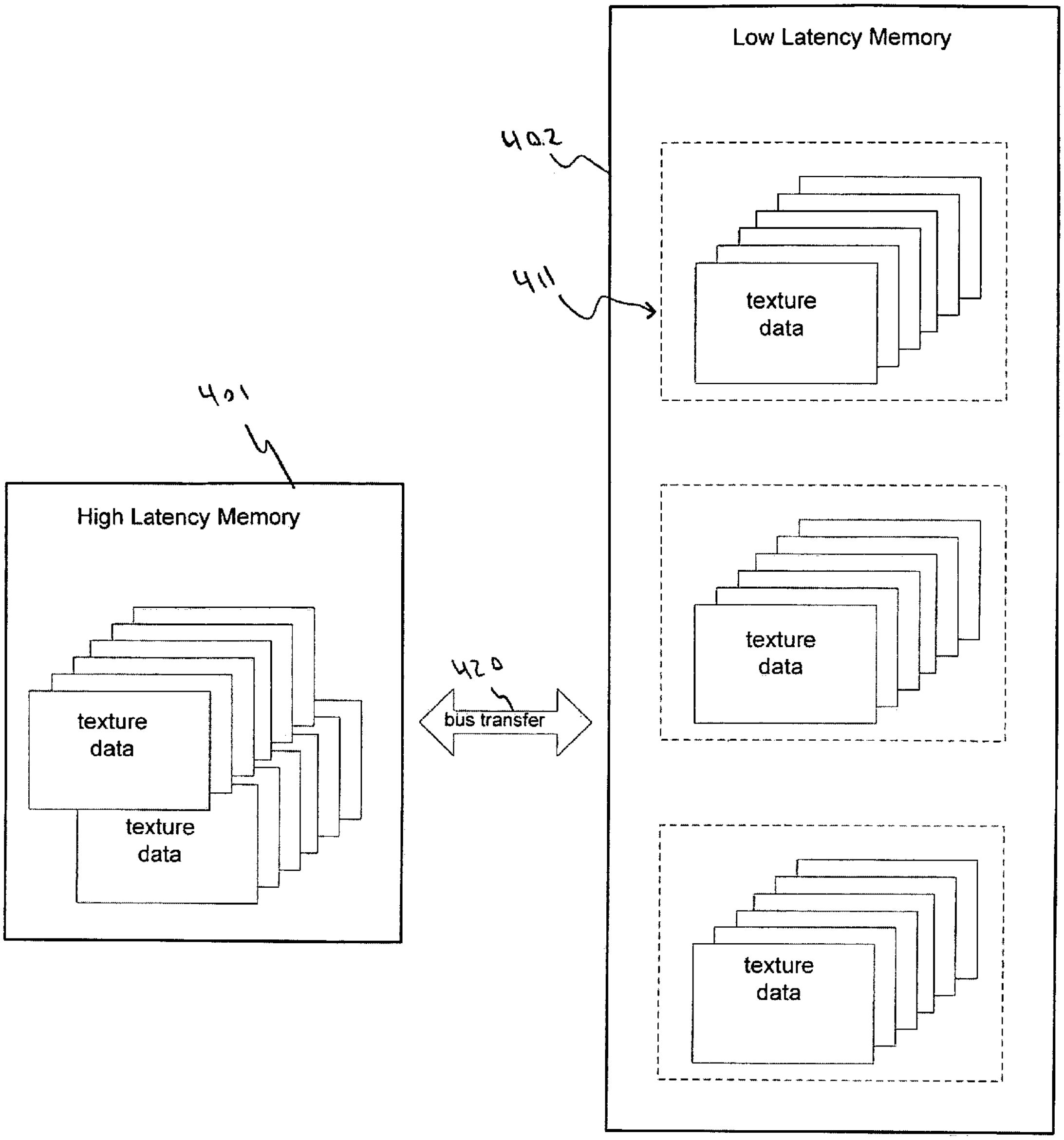
FIG. 5 shows a diagram depicting blocks of texture data of differing resolutions stored in high latency memory and low latency memory in accordance with one embodiment of the present invention.

FIG. 5 shows a diagram depicting blocks of texture data of differing resolutions stored in high latency memory 401 and low latency memory 402 in accordance with one embodiment of the present invention.

As described above, to facilitate handling, access, and fetching, each texture map is divided into a series of constituent blocks of texture data. Thus, each MIP map level is divided into a series of constituent blocks of texture data. Hence, for a given block of texture data, there exists corresponding different resolution versions of that block of texture data (e.g., a level 0 version of a block of texture data and a level 1 resolution version of a block of texture data, etc.).

Embodiments of the present invention utilize an intelligent texture data fetching process that maintains rendering speed and frame rate for the GPU. For example, in one embodiment, several blocks of level 0 texture data 411, level 1 texture data 412, and level 2 texture data 413 are stored in low latency memory 401. The texture data 411-413 is used in the MIP-mapping process executed by the GPU, for example, in the manner indicated in scene 300 of FIG. 4. In one embodiment, in those cases where the GPU requests access to a nonresident block of texture data that is not stored in low latency memory 402, the low latency memory is first searched for a resident version of the missing data, even if that resident version is a different resolution version. If found, that different resolution version is used instead. If there is no version of the missing texture data resident, then it is unavoidable that the missing texture data must be fetched first from the high latency memory. This allows the GPU to maintain its rendering frame rate and avoid stalling its pipelines. As the GPU uses the different resolution version, the correct resolution version of the nonresident block of texture data is fetched from the high latency memory 401. This gives the computer system time to fetch the correct resolution version block of texture data from the system memory 401 via a comparatively slow bus transfer (e.g., bus transfer 420).

In one embodiment, a virtual memory paging system is being used to manage texture memory. In such an embodiment, the blocks of texture data correspond to pages. Accordingly, a page fault mechanism is used to fetch the nonresident page of texture data. For example, when the GPU requests access to a nonresident page of texture data, a virtual memory subsystem can handle the request in the same manner as a page fault, and fetch the nonresident page from high latency memory (e.g., system memory) into the low latency memory (e.g., the graphics memory and/or graphics cache).

In this manner, a virtual memory subsystem can be extended to understand the particular issues related to accessing texture data for a 3D graphics rendering process. Instead of faulting and waiting for the host to supply data to the GPU, the GPU can simply re-issue a request to a coarser MIP-map level of the texture data until such a request succeeds (or some programmable number of faults has occurred, in which case normal fault handling could be started). In such an embodiment, applications could defer paging-in the needed texture data until a subsequent frame, with only minor impact on image quality due to the incorrect (e.g. coarser) MIP-map levels being used.

In one embodiment, proximity usage bits are added to texture pages/blocks which are currently being fetched by hardware in order to allow the device driver to better predict which pages/blocks are actually visible or potentially visible in the scene (e.g., 3D scene 300 of FIG. 4. The proximity uses bits would enable the tuning of a predictive fetch/prefetch mechanism to lower the occurrence of page faults due to nonresident texture pages/blocks.

In one embodiment, decompression functionality can be added to the page fault mechanism. In such an embodiment, the texture data in the high latency memory 401 is stored in a compressed form. Thus, when faulted pages are fetched from the high latency memory 401, the faulted pages are transferred more efficiently across the bus 420. The compressed texture data is then decompressed on-the-fly by the page fault mechanism (e.g., the GPU).

In one embodiment, the GPU can be configured to run a pixel shader program to regenerate faulted pages on the fly. In such an embodiment, nonresident blocks of texture data can be generated on-the-fly by filtering a resident block of texture data. For example, one of the texture data pages 411 can be filtered by the GPU using a shader program to obtain a coarser version of the texture data page. This coarser version of the texture data page is then used by the GPU until the correct version can be paged in from the high latency memory 401.

Alternatively, in one embodiment, a procedural texture can be implemented wherein the texture is generated using a program on-the-fly. In such an embodiment, a function can be used (e.g., fractal function, turbulence function, etc.) to generate the texture as opposed to fetching the texture image from some location in memory. Thus for example certain regular type textures (e.g., wood grain, marble, clouds, fire, etc.) can be realistically produced by a shader program. This method would allow different resolution versions of the texture to be produced as needed, potentially saving significant amounts of texture memory.

It should be noted that although embodiments of the present invention have been described in the context of MIP mapping, it should be understood by those skilled in the art that the texture memory management mechanisms as described herein are suited for use in other types of texture mapping functions which requires efficient management of texture memory (e.g., anisotropic filtering, antialiasing, etc.). As such, the texture block swapping process as described above can be utilized a respective of any texture block access "misses" when MIP mapping, or even when MIP mapping is not in use.

Figure 6:
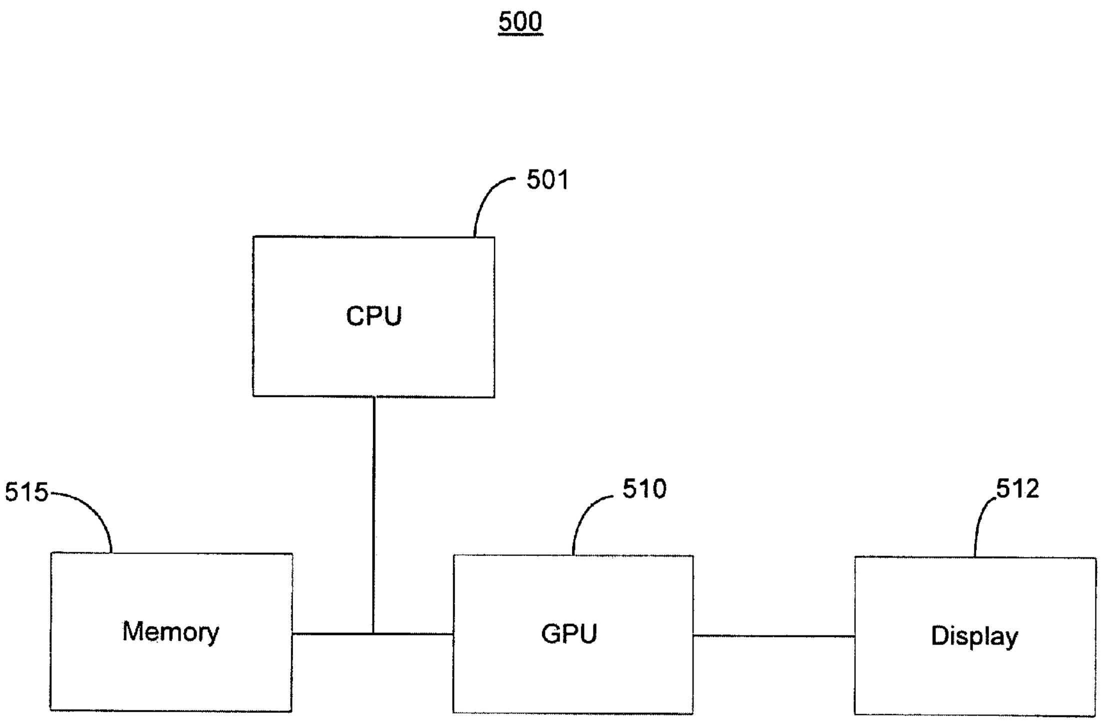
FIG. 6 shows a diagram depicting the components of a basic computer system in accordance with one embodiment of the present invention.

With reference now to FIG. 6, a computer system 500 in accordance with one embodiment of the present invention is shown. Computer system 500 shows the components of a basic computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 500) and are executed by the CPU of system 500. When executed, the instructions cause the computer system 500 to implement the functionality of the present invention as described below.

In general, computer system 500 comprises at least one CPU 501 coupled to a system memory 515 and a graphics processor unit (GPU) 510 via one or more busses as shown. The GPU 510 is coupled to a display 512. As shown in FIG. 6, system 500 shows the basic components of a computer system platform that implements the functionality of the present invention. Accordingly, system 500 can be implemented as, for example, a desktop computer system or server computer system, having a powerful general-purpose CPU 501 coupled to a dedicated graphics rendering GPU 510. In such an embodiment, components would be included that are designed to add peripheral buses, specialized graphics memory and system memory, IO devices, and the like. Additionally, it should be appreciated that although the GPU 510 is depicted in FIG. 6 as a discrete component, the GPU 510 can be implemented as a discrete graphics card designed to couple to the computer system via a graphics port (e.g., AGP port, or the like), as a discrete integrated circuit die (e.g., mounted directly on the motherboard), or as an integrated GPU included within the integrated circuit die of a computer system chipset (e.g., integrated within the Northbridge chip). Similarly, system 500 can be implemented as a set-top video game console device such as, for example, the Xbox®, available from Microsoft Corporation of Redmond, Wash.

Figure 7:
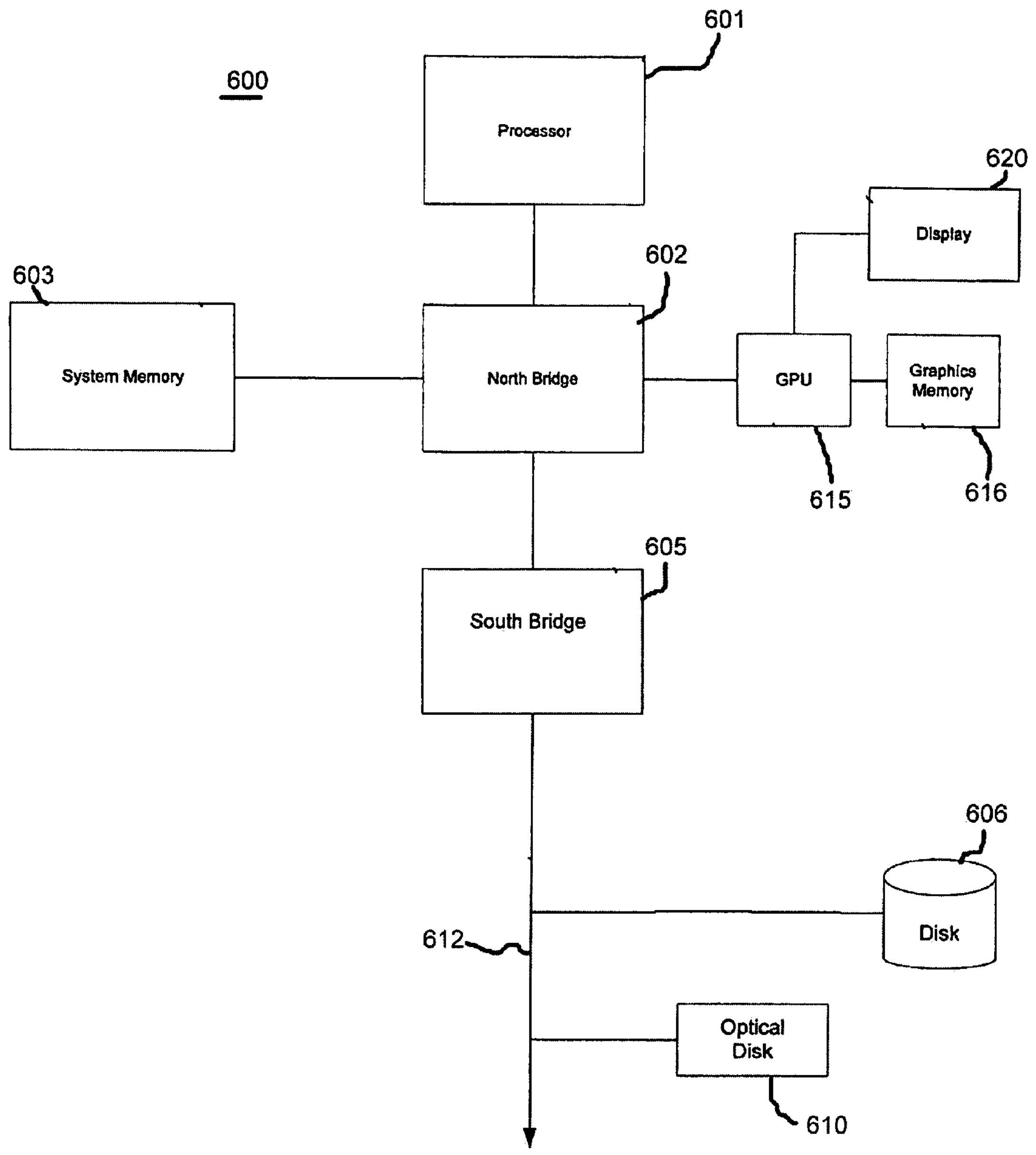
FIG. 7 shows a diagram of a second computer system in accordance with an alternative embodiment of the present invention.

FIG. 7 shows a diagram of a computer system 600 in accordance with an alternative embodiment of the present invention. Computer system 600 is substantially similar to computer system 500 of FIG. 6. Computer system 600 includes a GPU 615 and a general-purpose CPU 601 coupled to system memory 603 via a memory controller 602 (e.g., Northbridge). In this embodiment, a Southbridge 605 is coupled to an optical disk 610 (e.g., DVD ROM, CD ROM, etc.) via a bus 612 and a hard disk drive 606. The GPU 615 is coupled to drive a display 620. The GPU 615 is coupled to its local graphics memory 616.

As with computer system 500 of FIG. 6, computer system 600 can include additional components in accordance with specific requirements of a given application. Such components include, for example, specialized peripheral buses (e.g., 1394, USB, etc.), network connectivity (e.g., Ethernet, Bluetooth, etc.), and the like.

Figure 8:
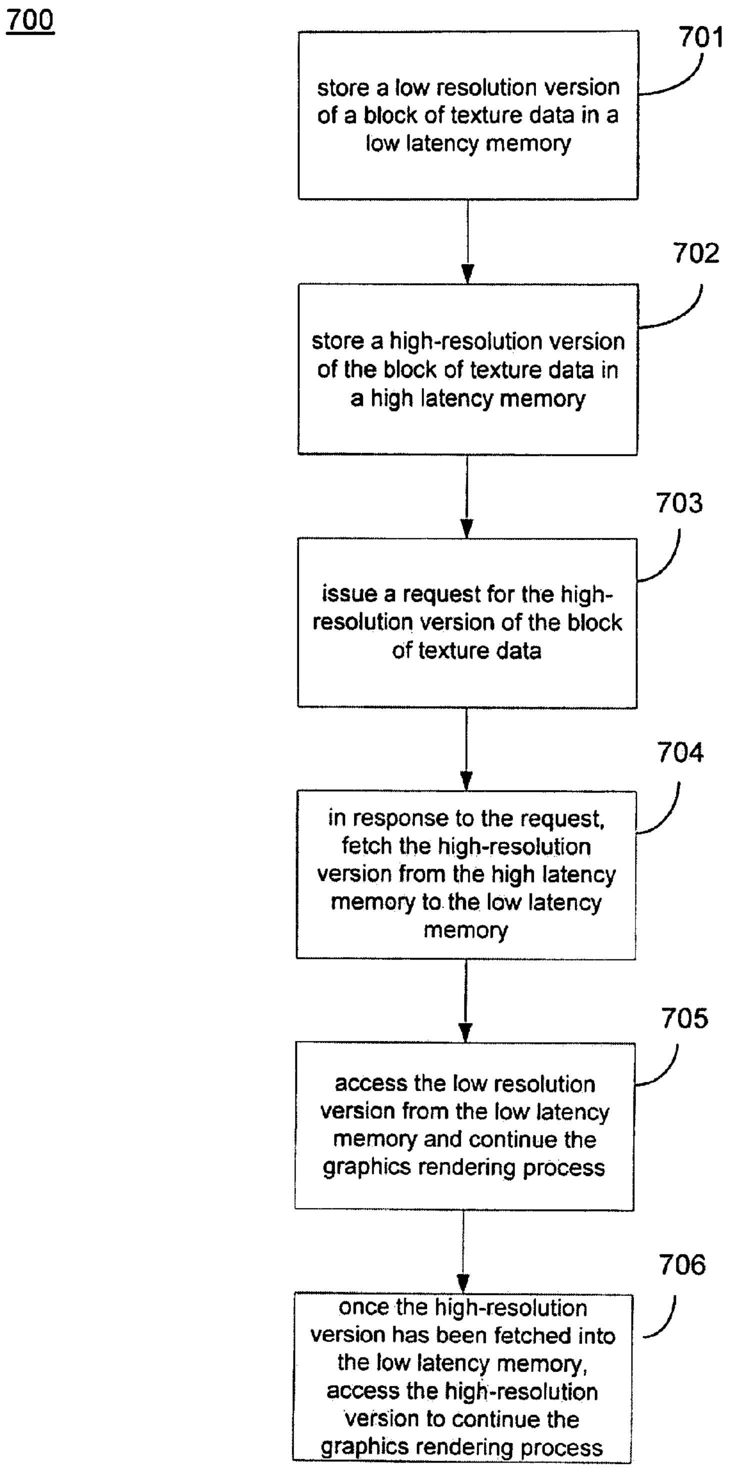
FIG. 8 shows a flowchart of the steps of a texture data access process in accordance with one embodiment of the present invention.

FIG. 8 shows a flowchart of the steps of a texture data accessing process 700 in accordance with one embodiment of the present invention. As depicted in FIG. 8, process 700 shows steps involved in accessing different blocks/pages of texture data of differing resolutions as implemented by a GPU of a computer system.

Process 700 begins in step 701, where a low resolution version of a block of texture data is stored in a low latency memory. As described above, the low latency memory can be local graphics memory (e.g., graphics memory 616 of FIG. 7) for the GPU (e.g., GPU 615). In step 702, a high-resolution version of the block of texture data is stored in a high latency memory. The high latency memory is typically system memory (e.g., system memory 603) of the computer system. In step 703, the GPU issues a request for the high-resolution version of the block of texture data. In step 704, in response to the request, the high-resolution version is fetched from the high latency memory to the low latency memory. In step 705, the GPU accesses the low resolution version from the low latency memory and continues the graphics rendering process (e.g., MIP mapping), as opposed to waiting for the high-resolution version to arrive in the low latency memory. In step 706, once the high-resolution version has been fetched into the low latency memory, the GPU can accesses the high-resolution version to continue the graphics rendering process.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for accessing texture data, comprising:

storing a low resolution version of a block of texture data in a low latency memory;

performing a graphics rendering process using the low resolution version of the block of texture data;

storing a high resolution version of the block of texture data in high latency memory;

upon a request for the high resolution version of the block of texture data, fetching the high resolution version of the block of texture data from the high latency memory to the low latency memory;

subsequent to the request and prior to arrival of the high resolution version of the block of texture data into the low latency memory, continuing a graphics rendering process by accessing the low resolution version of the block of texture data from the low latency memory until the high resolution version of the block of texture data is fetched into the low latency memory; and predicatively fetching a plurality of blocks from the high latency memory to the low latency memory by accessing respective proximity usage bits for each of the plurality of blocks, wherein the proximity usage bits are configured to indicate potentially visible blocks in a scene.

2. The method of claim 1, further comprising:

using a page fault process to fetch the high resolution version of the block of texture data from the high latency memory to the low latency memory upon the request.

3. The method of claim 1, further comprising:

performing a MIP mapping process by using the low resolution version of the block of texture data and the high resolution version of the block of texture data.

4. The method of claim 1, further comprising:

using a shader program to filter the high resolution version of the block of texture data to generate the low resolution version of the block of texture data.

5. The method of claim 1, wherein the high latency memory is system memory of a computer system.

6. The method of claim 1, wherein the low latency memory is local graphics memory for a GPU (graphics processor unit) of a computer system.

7. The method of claim 1, wherein the low latency memory includes cache memory for a GPU (graphics processor unit) of a computer system.

8. The method of claim 1 further comprising:

fetching a compressed form of the high resolution version of the block of texture data from the high latency memory to the low latency memory; and decompressing the compressed form of the high resolution version of the block of texture data for the low latency memory.

9. The method of claim 1, wherein the proximity usage bits are used to tune a prefetch mechanism to reduce occurrences of nonresident texture data.

10. A computer system for accessing texture data, comprising:

a graphics processor; and a memory coupled to the graphics processor and having computer readable code which when executed by the graphics processor cause the graphics processor to implement a method comprising:

storing a low resolution version of a block of texture data in a low latency memory;

storing a high resolution version of the block of texture data in high latency memory;

performing a graphics rendering process using the low resolution block of texture data;

upon a request for the high resolution version of the block of texture data, fetching the high resolution version of the block of texture data from the high latency memory to the low latency memory;

subsequent to the request and prior to arrival of the high resolution version of the block of texture data into the low latency memory, continuing the graphics rendering process by accessing the low resolution version of the block of texture data from the low latency memory until the high resolution version of the block of texture data is fetched into the low latency memory;

using a page fault process to fetch the high resolution version of the block of texture data from the high latency memory to the low latency memory upon the request; and predicatively fetching a plurality of blocks from the high latency memory to the low latency memory by accessing respective proximity usage bits for each of the plurality of blocks, wherein the proximity usage bits are configured to indicate potentially visible blocks in a scene.

11. The system of claim 10, wherein a virtual memory subsystem is used to implement the page fault process to fetch the high resolution version of the block of texture data from the high latency memory to the low latency memory.

12. The system of claim 10, further comprising:

performing a MIP mapping process by using the low resolution version of the block of texture data and the high resolution version of the block of texture data.

13. The system of claim 10, further comprising:

using a shader program to filter the high resolution version of the block of texture data to generate the low resolution version of the block of texture data.

14. The system of claim 10, wherein the high latency memory is system memory of the computer system.

15. The system of claim 10, wherein the low latency memory is local graphics memory for the graphics processor.

16. The system of claim 10, wherein the low latency memory includes cache memory for the graphics processor.

17. The system of claim 10 further comprising:

fetching a compressed form of the high resolution version of the block of texture data from the high latency memory to the low latency memory; and decompressing the compressed form of the high resolution version of the block of texture data for the low latency memory.

18. The system of claim 10, wherein the proximity usage bits are used to tune a prefetch mechanism to reduce occurrences of nonresident texture data.

19. A method for performing MIP mapping in a computer system, comprising:

performing a real time 3D rendering operation using a GPU (graphics processor unit);

implementing MIP mapping for the rendering operation by:

accessing a low resolution version of a block of texture data in a local graphics memory;

accessing a high resolution version of the block of texture data in system memory;

upon a request for the high resolution version of the block of texture data, fetching the high resolution version of the block of texture data from system memory to local graphics memory;

subsequent to the request and prior to arrival of the high resolution version of the block of texture data into the low latency memory, continuing the MIP mapping by accessing the low resolution version of the block of texture data from local graphics memory until the high resolution version of the block of texture data is fetched into local graphics memory; and predicatively fetching a plurality of blocks from the high latency memory to the low latency memory by accessing respective proximity usage bits for each of the plurality of blocks, wherein the proximity usage bits are configured to indicate potentially visible blocks in a scene.

20. The method of claim 19, further comprising:

using a page fault process to fetch the high resolution version of the block of texture data from system memory to local graphics memory upon the request.

21. The method of claim 19, wherein a shader program filters the high resolution version of the block of texture data to generate the low resolution version of the block of texture data.

22. The method of claim 19, wherein system memory is accessed by the GPU via a bridge component and a system memory bus of the computer system.

23. The method of claim 19, wherein local graphics memory is accessed by the GPU via a local graphics bus.

24. The method of claim 19 further comprising:

fetching a compressed form of the high resolution version of the block of texture data from the high latency memory to the low latency memory; and decompressing the compressed form of the high resolution version of the block of texture data for the low latency memory.

25. The method of claim 19 further comprising:

wherein the proximity usage bits are used to tune a prefetch mechanism to reduce occurrences of nonresident texture data.

* * * * *